March 9, 1926.  
G. W. DRAKE ET AL  
1,575,742  
PILOT BAR CONSTRUCTION FOR MACHINE TOOLS  
Filed April 16, 1924　2 Sheets-Sheet 2
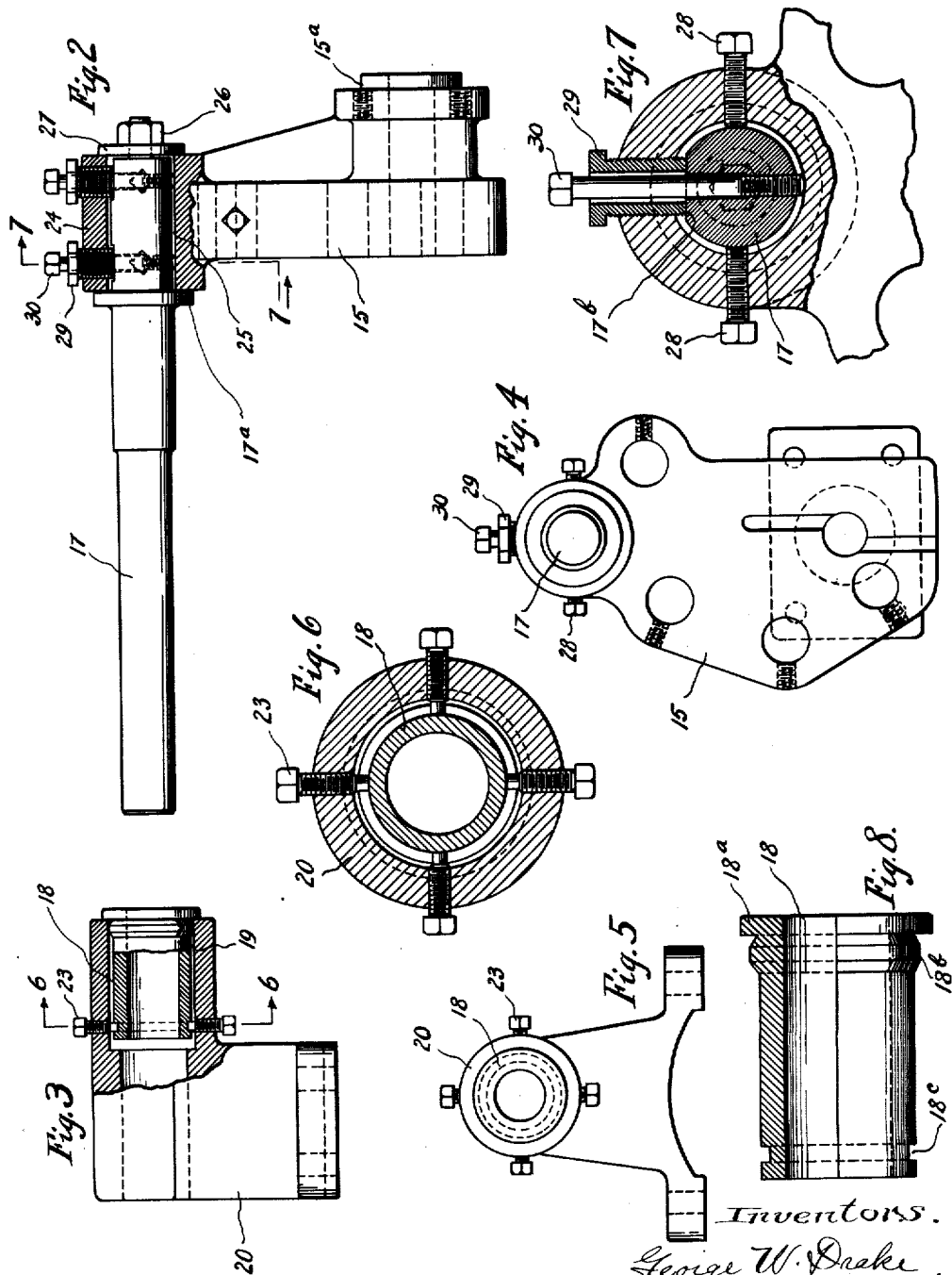

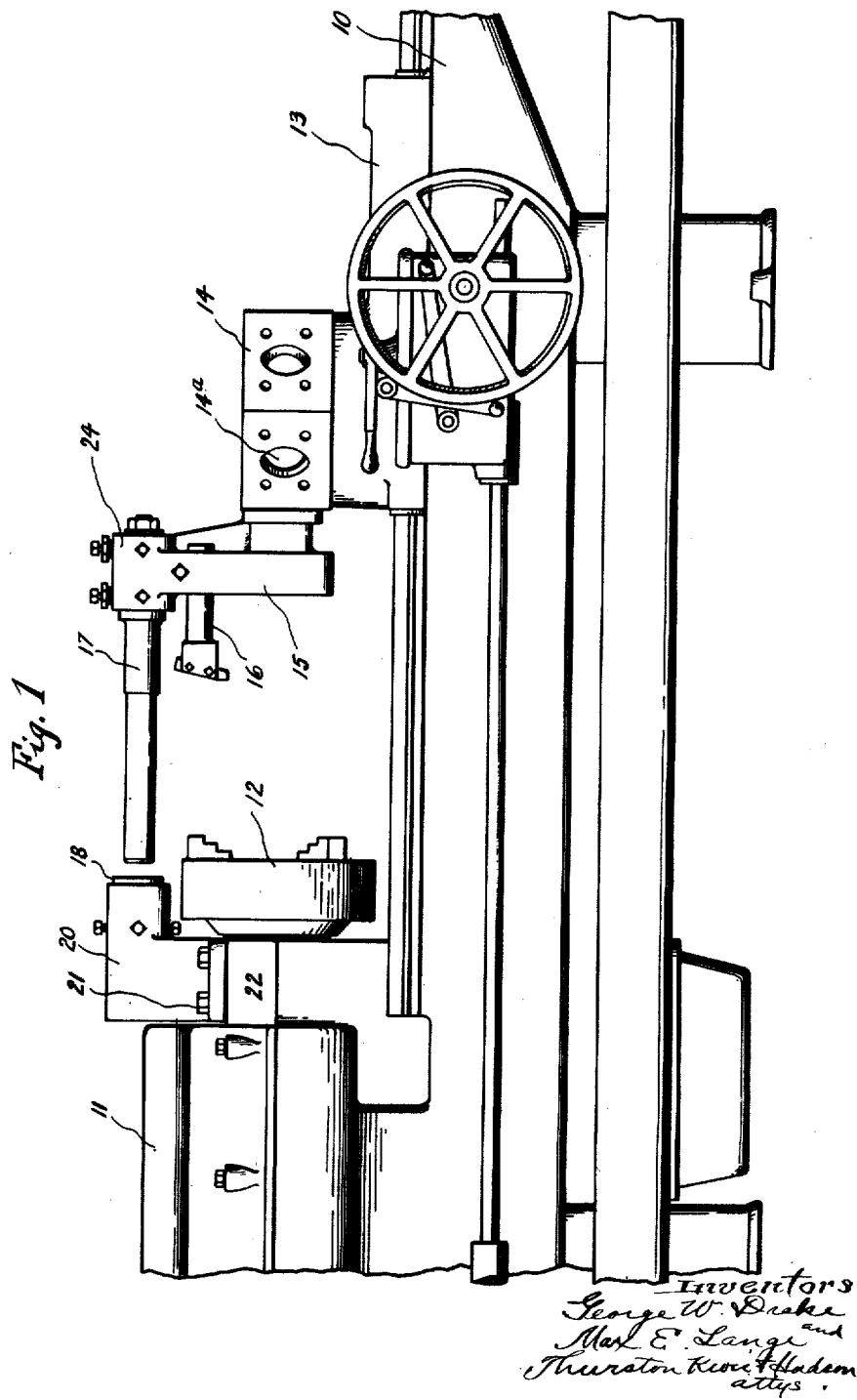

Patented Mar. 9, 1926.

1,575,742

UNITED STATES PATENT OFFICE.

GEORGE W. DRAKE, OF CLEVELAND HEIGHTS, AND MAX E. LANGE, OF EAST CLEVELAND, OHIO, ASSIGNORS TO THE WARNER AND SWASEY COMPANY, OF CLEVELAND, OHIO, A CORPORATION OF OHIO.

PILOT-BAR CONSTRUCTION FOR MACHINE TOOLS.

Application filed April 16, 1924. Serial No. 706,808.

*To all whom it may concern:*

Be it known that we, GEORGE W. DRAKE and MAX E. LANGE, citizens of the United States, and residents, respectively, of Cleveland Heights, in the county of Cuyahoga and State of Ohio, and East Cleveland, in the county of Cuyahoga and State of Ohio, have invented a certain new and useful Improvement in Pilot-Bar Constructions for Machine Tools, of which the following is a full, clear, and exact description.

This invention relates to machine tools such as lathes and the like, and particularly to a pilot bar construction employed on certain machine tools for the purpose of stiffening or steadying the sliding member, usually the tool carrying slide, especially when heavy cuts are designed to be taken, or when the tools overhang the slide a considerable distance, as is frequently the case in turret lathes.

Heretofore, in machines employing pilot bars and bushings for the purpose stated, a great deal of difficulty has been encountered and time and labor expended in aligning the bushing and pilot bar with one another and bringing both in parallel relation with the spindle, or with the axis of the machine. This difficulty in aligning these parts is experienced when the machine is constructed and the parts originally assembled, and also in making a set-up when the machine is in use. When a lathe is used on different kinds of work, as is well known, the tools must be removed and replaced with others, and as it is generally the case that the pilot bar is supported on a tool holding bracket, the pilot bar is removed with the bracket, and in replacing the tool holding bracket with its pilot bar it is very difficult to restore it on the bracket holding member, which may be a turret, in exactly the same position that it previously had. Furthermore, the turrets of turret lathes are generally provided on their several faces with openings adapted to receive annular bosses on the tool and pilot holding brackets to accurately locate or center the brackets, and in making a number of these brackets a variation may exist between the centers of the different pilot bars and the centers of the bosses which are to be received in the openings of the turret. Additionally the wear on the ways of the bed over which the turret slide is adapted to move may cause misalignment between the pilot bar or bars carried by the turret and the bushing which is adapted to receive them. Furthermore, misalignment between the bushing and the pilot bar or bars is likely to occur when the same tool and pilot bar holding brackets are used on different machines. In the machines as heretofore constructed, these conditions have been corrected or compensated for at the expense of much time and labor.

The principal object of the present invention is to provide a pilot bar construction which will permit the bar and bushing to be readily and quickly brought into alignment with each other, and into parallelism with the axis of the machine so as to reduce the labor and time required to bring about this alignment both when the parts are originally assembled and when repeated set-ups are being made.

Our invention resides in certain features of adjustment which may be given preferably both to the pilot bar and the bushing or other part with which the pilot bar is adapted to have sliding engagement, and to certain novel details of construction of these parts as well as the supporting means therefor, as will be described more fully in the following detailed description and set forth in the appended claims.

In the accompanying sheets of drawings wherein we have illustrated the preferred form of our invention, Fig. 1 is a side view of a lathe equipped with our invention, a turret lathe being here illustrated as an example of one of the types of machine tools to which the invention may be applied, and parts of the lathe unnecessary to the understanding of the invention being omitted; Fig. 2 is a side elevation of the tool holder bracket and pilot bar with parts in section; Fig. 3 is a side elevation of the bushing supporting bracket and the bushing therein with parts in section; Fig. 4 is a face view of Fig. 2 looking toward the right; Fig. 5 is a similar view of Fig. 3 looking toward the left; Fig. 6 is a transverse sectional view substantially along the line 6—6 of Fig. 3, looking in the direction indicated by the arrows; Fig. 7 is a transverse sectional view substantially along the line 7—7 of Fig. 2 looking in the direction indicated by the arrows; and Fig. 8 is a detached view of the bushing partly in section.

Referring now to the drawings, the lathe here shown has a bed 10 with a head 11 supporting the work holding member here shown as a chuck 12. For convenience of description the bed and head may be regarded as forming a part of the frame of the machine. Adapted to slide back and forth over the ways of the bed is a turret slide 13 carrying a turret 14, to one face of which is bolted a tool holder bracket 15 supporting a tool holder 16 and the pilot bar 17. There may be any number of these tools holder brackets with pilot bars bolted to the different faces of the turret, and, of course, any number and types of tools secured to the different brackets 15. As is customary, each bracket 15 has a circular boss 15ª adapted to be received in a circular opening 14ª in the face of the turret 14. It will be understood that when a plurality of brackets with their tool holders and pilot bars are bolted to the face of the turret, the rotation of the turret will bring the different tools and pilot bars successively into operation, and the pilot bars successively into alignment with the bushing which is adapted to receive the pilot bar as the turret slide moves forwardly for the cutting operation.

The pilot bar is designed to have sliding engagement with a part, in this instance in the form of a bushing 18, which is supported in the bore 19 of a bracket 20, which in this instance is secured by bolts 21 to the spindle bearing cap 22, which in turn is secured by the bolts 21 to the frame of the machine. Obviously the bracket may be secured to different parts of the frame, as for example, the bed 10, or the head 11, and as far as the main features of our invention are concerned, the position of the pilot bar and bushing may be reversed, though preferably the pilot bar is associated with the tool holder and the bushing with the work holder, in which event it will be suitably attached to the frame of the machine, as in the manner illustrated.

Likewise, when the pilot bar is associated with the tool holder or tool carrying slide, it is not necessary that it be mounted as herein shown. The slide may or may not have a turret, and if it has a turret, the pilot bar may be secured to it in different ways, as for example, to the top of the turret.

In carrying out our invention in its preferred form, both the bushing and the pilot bar are supported so as to be capable of adjustment to align these parts with respect to each other and to bring them into parallel relation with the axis of the machine, and preferably the bushing is capable of an angular adjustment, i. e. angular with respect to the axis of the bore 19 of the bracket 20, and preferably the pilot bar is susceptible of two different adjustments, one consisting of an angular adjustment and the other a radial adjustment with respect to the bracket 15, as will be more fully understood by the following description.

Considering first the mounting of the bushing by which the described adjustment is obtained or permitted, it will be observed that the bushing is provided at its forward end with an annular flange 18ª designed to bear against the forward end of the bracket. Likewise, it will be seen that the bushing is provided close to and just inwardly of the flange 18ª with an annular bearing part 18ᵇ. Beyond this bearing part, i. e. inwardly thereof, the bushing is of less external diameter than the diameter of the bearing part, and at the opposite end of the bushing an annular groove 18ᶜ is provided. The annular bearing part 18ᵇ fits the bore 19 of the bracket 20, and therefore between this bearing part and the opposite or inner end of the bushing there is clearance between the bushing and the cylindrical wall of the bore 19 in the bracket. The inner end of the bushing is supported by a plurality of adjustable set screws 23 which extend through the wall of the bracket and which have their inner ends engaging in the groove 18ᶜ of the bushing. Since the forward end of the bushing or the bearing part 18ᵇ fits the bore 19 it will be obvious that by adjusting the screws 23 the rear or inner end of the bushing can be moved in any direction so that the bushing as a whole is rocked by the bearing part 18ᵇ as an axis or fulcrum. In other words, the bushing can be given any desired angular adjustment with respect to the axis of the bore 19. It might be here stated that this adjustment is for the purpose of compensating for any error in the location of the bracket 20 when it is bolted to the frame of the machine, and of eliminating the necessity of extreme accuracy in machining and assembling which otherwise would be required.

The flange 18ª at the forward end of the bushing, and the screws 23 engaging in the annular groove 18ᶜ of the bushing hold the bushing against axial or endwise movement when the pilot bar is moved into and out of the bushing.

Taking up next the pilot bar 17, it will be observed that the tool holder bracket 15 has at its outer end a boss 24 which is provided with a bore 25 which receives the rear end of the pilot bar, the latter being provided with an annular flange 17ª which bears aganist the forward end of boss 24. At the rear end the pilot bar is provided with a threaded reduced portion on which is screwed a nut 26, and a washer 27 on the reduced part of the pilot bar is held by the nut 26 against the rear end of boss 24. Thus by the flange 17ª and by the washer 27 the pilot bar is held against endwise movement in the bore 25 of the tool holder boss 24.

As stated above, the pilot bar is preferably capable of two different adjustments, one radial and the other angular with respect to the axis of the bore 25 of the bracket 15, and while these adjustments may be given in different ways and the pilot bar held in any given adjusted position by different instrumentalities, the construction illustrated in Figs. 2 and 7 is preferred. By referring to these figures it will be seen that two sets of screws and bolts are utilized in adjusting and supporting the pilot bar in the bore 25. Each set includes two adjustable set screws 28 which are diametrically opposite each other and extend through the boss 24 into the bore 25 and are adapted to engage, as shown in Fig. 7, diametrically opposite points of the pilot bar. Additionally, each set includes a screw bushing 29 which extends through the top of the boss 24, midway between the set screws 28, and projects into the bore 25 into engagement with the top of the pilot bar, the pilot bar at this point having a flat face 17ᵇ designed to engage the lower or inner end of the screw bushing. The flat face 17ᵇ of the pilot bar is held against the inner end of the screw bushing 29 by a screw 30 which passes freely through the screw bushing, and through the bar with which the screw has threaded engagement, the lower end of the screw bearing against the bottom of the wall forming the bore 25. It will be apparent that by tightening or screwing down screw 30 the bar is forced up against the inner end of screw bushing 29, which has the double effect of holding the bar and of locking the screw bushing 29 from turning by the pressure thus exerted between the threads of the screw bushing and the threaded socket of the boss 24 which receives the bushing.

It is essential that the screw 30 have the same or a greater clearance in the bushing 29 than the inner end of the pilot bar has with the wall of bore 25, for when the bar is moved laterally in either direction, the screw 30 moves with it, and when the screw 30 is moved laterally it should be clear of the wall of the bore in the bushing 29. As stated above, there are two sets of adjusting and supporting screws, each set being identical, and similar to that described.

It will be seen from the construction illustrated and described, that the pilot bar as a whole can be moved bodily in any direction radially with respect to the axis of the bore, and that it can be moved angularly in any direction with respect to the axis of the bore. The radial and angular adjustments or movements which can thus be given to the pilot bar compensates for errors in forming the bore 25 or in locating and bolting the bracket 15 to its support, which in this instance is one face of the turret as already stated.

It will be seen, therefore, that by reason of the manner of mounting and adjusting the bushing and pilot bar, these two members can be quickly aligned and brought into perfect parallelism with the axis of the machine so as to allow free movement to the slide, notwithstanding errors in machining and mounting the brackets or other members which carry the bushing and pilot bar.

We do not desire to be confined to the precise details or arrangements shown, but aim in our claims to cover all modifications which do not involve a departure from the spirit and scope of our invention as set forth in the appended claims.

Having described our invention, we claim:

1. In a machine tool, a frame, work and tool holding members one movable toward and from the other along the frame, and means for producing a stiffening or steadying action in the movable member comprising a pilot bar and a co-operating part each associated with one of said members and adapted to have sliding engagement by the relative movement between said members, both the pilot bar and said co-operating part being capable of adjustment so as to compensate for misalignment of said parts, and also to compensate for an angular displacement thereof relative to a position in parallelism with the axis of the machine.

2. In a machine tool, a frame, work and tool holding members one movable toward and from the other along the frame, and means for producing a stiffening or steadying action in the movable member, comprising a part in the form of a pilot bar and a co-operating part with which the pilot bar has sliding engagement when relative movement occurs between said work and tool holding members and one of said parts having a mounting which permits it to be adjusted angularly.

3. In a machine tool, a frame, work and tool holding members one movable toward and from the other along the frame, and means for producing a stiffening or steadying action in the movable member, comprising a part in the form of a pilot bar and a co-operating part with which the pilot bar has sliding engagement when relative movement occurs between said work and tool holding members, one of said parts having a mounting which permits it to be adjusted radially and angularly.

4. In a machine tool, a frame, work and tool holding members one movable toward and from the other along the frame, and means for producing a stiffening or steadying action in the movable member comprising a part in the form of a pilot bar and a co-operating part with which the pilot bar has sliding engagement when relative movement occurs between said work and tool holding members, both of said parts having mountings which permit them to be adjusted angularly to bring them into alignment with each other and into parallelism with the axis of the machine.

5. In a machine tool, a frame, work and tool holding members one movable toward and from the other along the frame, means for producing a stiffening and steadying action in the movable member comprising two parts including a pilot bar and a co-operating part with which the bar has sliding engagement when relative movement occurs between the work and tool holding members, each of said parts being associated with one of said members, a bracket carried by one of said members and supporting one of said parts, and means for adjusting said part angularly in said bracket.

6. In a machine tool, a frame, work and tool holding members one movable toward and from the other along the frame, means for producing a stiffening and steadying action in the movable member comprising two parts including a pilot bar and a co-operating part with which the bar has sliding engagement when relative movement occurs between the work and tool holding members, each of said parts being associated with one of said members, a tool holding bracket carried by one of said members and supporting one of said parts, and means for adjusting said part in the bracket angularly and radially.

7. In a machine tool, a frame, work and tool holding members, and a pilot bar construction including an adjustably mounted bushing associated with one of said members and a pilot bar associated with the other member and adapted to have sliding engagement with said bushing when relative movement occurs between said members, both the bushing and pilot bar being mounted for adjustment to compensate for misalignment of said parts and also to compensate for an angular displacement thereof with respect to a position in parallelism with the axis of the machine.

8. In a machine tool, a frame, work and tool holding members one movable toward and from the other along the frame, and a pilot bar construction comprising a bushing and a pilot bar adapted to be received therein and each associated with one of said members, and means for angularly adjusting one end of the bushing about its other end.

9. In a machine tool, a frame, work and tool holding members one movable toward and from the other along the frame, and a pilot bar construction comprising a bushing and a pilot bar each associated with one of said members, and the pilot bar adapted to be received in the bushing when relative movement occurs between said members, a support for the bushing comprising a member having a bore in which one end of the bushing has a close fit, and adjustable means supporting the other end of the bushing so that the latter may be angularly adjusted about the first-named end.

10. In a machine tool, a frame, work and tool holding members one movable toward and from the other along the frame, and a pilot bar construction comprising a bushing and a pilot bar adapted to be received in the bushing, each of said parts being associated with one of said members, and a support for the bushing comprising a member having a bore receiving the bushing, the bushing having an annular portion which fits said bore, and adjustable means engaging said bushing to adjust it angularly in the bore.

11. In a machine tool, a frame, work and tool holding members one movable toward and from the other along the frame, and a pilot bar construction comprising a bushing and a pilot bar adapted to be received in the bushing, each of said parts being associated with one of said members, a support for the bushing comprising a member having a bore receiving the bushing, the bushing being provided at one end with an annular part fitting the bore, and adjusting screws carried by the supporting member and engaging the opposite end of the bushing.

12. In a machine tool, a frame, work and tool holding members one movable toward and away from the other along the frame, and a pilot bar construction comprising a pilot bar and a co-operating member with which the bar has sliding engagement when relative movement occurs between said members, a holder for the pilot bar having a bore receiving the pilot bar, and means extending through the holder and engaging the pilot bar to adjust the position of the same.

13. In a machine tool, a frame, work and tool holding members one movable toward and from the other along the frame, a pilot bar construction comprising a pilot bar movable with the tool holding member and a stationary part with which the bar has sliding engagement when relative movement occurs between said members, a tool holding bracket connected with the tool holding member and having a bore receiving the pilot bar, and means for adjusting the bar in the bore of the bracket.

14. In a machine tool, a frame, work and tool holding members one movable toward and from the other along the frame, and a pilot bar construction comprising a pilot bar associated with one of said members and a bushing associated with the other and adapted to receive the pilot bar, a bracket supporting the pilot bar having a bore into which the pilot bar projects, and means extending through the bracket into engagement with the pilot bar for adjusting it angularly with respect to the bracket.

15. In a machine tool, a frame, work and tool holding members one movable toward and from the other along the frame, and a pilot bar construction comprising a pilot bar associated with one of said members and a bushing associated with the other and adapted to receive the pilot bar, a bracket supporting the pilot bar having a bore into which the pilot bar projects, and means for adjusting the pilot bar angularly and radially with respect to the bracket.

16. In a machine tool, a frame, work and tool holding members one movable toward and from the other along the frame, a pilot bar construction comprising a bushing associated with one of said members and a pilot bar adapted to be received in the bushing and associated with the other of said members, a bracket for supporting said pilot bar on its associated member and having a bore receiving the pilot bar, means for adjusting the pilot bar in the bore and for holding it in adjusted position comprising an adjustable abutment carried by the bracket, and a screw for tightly holding the pilot bar against said abutment.

17. In a machine tool, a frame, work and tool holding members one movable toward and from the other along the frame, a pilot bar construction comprising a bushing associated with one of said members and a pilot bar adapted to be received in the bushing and associated with the other of said members, a bracket for supporting said pilot bar on its associated member and having a bore receiving the pilot bar, means for adjusting the pilot bar in the bore and for holding it in adjusted position comprising screws extending into the bore from opposite directions and engaging the pilot bar, an adjustable screw bushing extending into the bore intermediate said screws, and a screw extending through said screw bushing for pressing the bar against the inner end of the said screw bushing.

In testimony whereof, we hereunto affix our signatures.

GEORGE W. DRAKE.
MAX E. LANGE.

and from the other along the frame, and a pilot bar construction comprising a pilot bar associated with one of said members and a bushing associated with the other and adapted to receive the pilot bar, a bracket supporting the pilot bar having a bore into which the pilot bar projects, and means extending through the bracket into engagement with the pilot bar for adjusting it angularly with respect to the bracket.

15. In a machine tool, a frame, work and tool holding members one movable toward and from the other along the frame, and a pilot bar construction comprising a pilot bar associated with one of said members and a bushing associated with the other and adapted to receive the pilot bar, a bracket supporting the pilot bar having a bore into which the pilot bar projects, and means for adjusting the pilot bar angularly and radially with respect to the bracket.

16. In a machine tool, a frame, work and tool holding members one movable toward and from the other along the frame, a pilot bar construction comprising a bushing associated with one of said members and a pilot bar adapted to be received in the bushing and associated with the other of said members, a bracket for supporting said pilot bar on its associated member and having a bore receiving the pilot bar, means for adjusting the pilot bar in the bore and for holding it in adjusted position comprising an adjustable abutment carried by the bracket, and a screw for tightly holding the pilot bar against said abutment.

17. In a machine tool, a frame, work and tool holding members one movable toward and from the other along the frame, a pilot bar construction comprising a bushing associated with one of said members and a pilot bar adapted to be received in the bushing and associated with the other of said members, a bracket for supporting said pilot bar on its associated member and having a bore receiving the pilot bar, means for adjusting the pilot bar in the bore and for holding it in adjusted position comprising screws extending into the bore from opposite directions and engaging the pilot bar, an adjustable screw bushing extending into the bore intermediate said screws, and a screw extending through said screw bushing for pressing the bar against the inner end of the said screw bushing.

In testimony whereof, we hereunto affix our signatures.

GEORGE W. DRAKE.
MAX E. LANGE.

DISCLAIMER.

1,575,742.—*George W. Drake*, Cleveland Heights, and *Max E. Lange*, East Cleveland, Ohio. PILOT-BAR CONSTRUCTION FOR MACHINE TOOLS. Date of patent March 9, 1926. Disclaimer filed January 10, 1929, by the assignee, *The Warner and Swasey Company*.

Hereby disclaims the bar adjusting means recited in the last clause of claim 13 except adjusting means which changes the position of the axis of the bar with reference to the bore of the bracket which receives the bar, for the purpose described in the specification of said patent.

[*Official Gazette January 29, 1929.*]

DISCLAIMER.

1,575,742.—*George W. Drake*, Cleveland Heights, and *Max E. Lange*, East Cleveland, Ohio. PILOT-BAR CONSTRUCTION FOR MACHINE TOOLS. Date of patent March 9, 1926. Disclaimer filed January 10, 1929, by the assignee, *The Warner and Swasey Company*.

Hereby disclaims the bar adjusting means recited in the last clause of claim 13 except adjusting means which changes the position of the axis of the bar with reference to the bore of the bracket which receives the bar, for the purpose described in the specification of said patent.

[*Official Gazette January 29, 1929.*]